United States Patent
Buergers et al.

(10) Patent No.: US 12,152,751 B2
(45) Date of Patent: Nov. 26, 2024

(54) HEADLIGHT FOR A MOTOR VEHICLE

(71) Applicant: Bayerische Motoren Werke Aktiengesellschaft, Munich (DE)

(72) Inventors: Benedikt Buergers, Gauting (DE); Felix Kilbertus, Munich (DE); Martin Simmet, Munich (DE); Dean Smith, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/278,031

(22) PCT Filed: Apr. 7, 2022

(86) PCT No.: PCT/EP2022/059267
§ 371 (c)(1),
(2) Date: Aug. 21, 2023

(87) PCT Pub. No.: WO2022/228853
PCT Pub. Date: Nov. 3, 2022

(65) Prior Publication Data
US 2024/0125447 A1 Apr. 18, 2024

(30) Foreign Application Priority Data
Apr. 28, 2021 (DE) .................. 10 2021 110 847.0

(51) Int. Cl.
*F21S 41/43* (2018.01)
*B60Q 1/00* (2006.01)
(Continued)

(52) U.S. Cl.
CPC ............ *F21S 41/43* (2018.01); *B60Q 1/0041* (2013.01); *B60Q 1/1415* (2013.01); *B60Q 1/32* (2013.01);
(Continued)

(58) Field of Classification Search
CPC ...... B60Q 1/0041; B60Q 1/1415; B60Q 1/32; F21S 41/43; F21S 41/24; F21S 41/28
See application file for complete search history.

(56) References Cited

U.S. PATENT DOCUMENTS 10,648,633 B2 * 5/2020 Paradis ................. F21S 43/243
11,021,095 B2 * 6/2021 Spenner ............... B60Q 1/0041
(Continued)

FOREIGN PATENT DOCUMENTS

| CN | 111692571 A | 9/2020 |
|----|-------------|--------|
| DE | 199 63 337 A1 | 7/2001 |

(Continued)

OTHER PUBLICATIONS

International Search Report (PCT/ISA/210) issued in PCT Application No. PCT/EP2022/059267 dated Jul. 25, 2022 with English translation (6 pages).
(Continued)

*Primary Examiner* — Matthew J. Peerce
(74) *Attorney, Agent, or Firm* — Crowell & Moring LLP

(57) ABSTRACT

A headlight for a motor vehicle includes a housing which is provided with a translucent cover pane to allow light to exit from the headlight and in which a first lighting device and a second lighting device are located. The first lighting device is provided for generating at least one portion of a dipped beam and/or a full beam of the headlight, and the second lighting device is provided for generating at least one portion of a limiting light and/or a daytime running light of the headlight. The headlight also includes a diaphragm which is opaque in a predefined diaphragm section except for a plurality of light exit points provided therein. Light is emitted via the predefined diaphragm section toward the
(Continued)

cover pane by the second lighting device in order to generate the at least one portion of the limiting light and/or the daytime running light.

19 Claims, 2 Drawing Sheets

(51) Int. Cl.
    *B60Q 1/14*     (2006.01)
    *B60Q 1/32*     (2006.01)
    *F21S 41/20*     (2018.01)
    *F21S 41/24*     (2018.01)
    *F21W 102/13*     (2018.01)
    *F21W 103/20*     (2018.01)

(52) U.S. Cl.
    CPC .............. *F21S 41/24* (2018.01); *F21S 41/28* (2018.01); *F21W 2102/13* (2018.01); *F21W 2103/20* (2018.01)

(56) References Cited

U.S. PATENT DOCUMENTS

| | | | |
|---|---|---|---|
| 11,318,880 B2* | 5/2022 | Fujii | ...................... B60Q 1/535 |
| 2001/0043477 A1 | 11/2001 | Ott et al. | |
| 2008/0175017 A1 | 7/2008 | Terada et al. | |
| 2011/0194301 A1 | 8/2011 | Schneider et al. | |
| 2012/0051077 A1* | 3/2012 | Arai | ........................ F21S 41/24 |
| | | | 362/516 |
| 2013/0314946 A1 | 11/2013 | Wilson et al. | |
| 2016/0369969 A1 | 12/2016 | Tokieda et al. | |

FOREIGN PATENT DOCUMENTS

| | | |
|---|---|---|
| DE | 101 24 539 A1 | 11/2002 |
| DE | 10 2004 010 305 A1 | 9/2005 |
| DE | 10 2004 051 178 A1 | 5/2006 |
| DE | 10 2007 036 793 A1 | 2/2009 |
| DE | 10 2010 006 974 A1 | 8/2011 |
| DE | 10 2010 032 190 A1 | 6/2012 |
| DE | 10 2011 015 012 A1 | 9/2012 |
| DE | 10 2011 076 621 A1 | 11/2012 |
| DE | 10 2012 003 200 A1 | 8/2013 |
| DE | 10 2016 111 242 A1 | 12/2017 |
| DE | 10 2018 002 721 A1 | 10/2019 |
| DE | 10 2018 124 384 A1 | 4/2020 |
| EP | 2 199 663 A1 | 6/2010 |
| EP | 2 289 781 A1 | 3/2011 |
| FR | 2 888 796 A1 | 1/2007 |
| JP | 2016-6745 A | 1/2016 |

OTHER PUBLICATIONS

German-language Written Opinion (PCT/ISA/237) issued in PCT Application No. PCT/EP2022/059267 dated Jul. 25, 2022 with English translation (9 pages).

German-language Search Report issued in German Application No. 10 2021 110 847.0 dated Dec. 8, 2021 with partial English translation (12 pages).

\* cited by examiner

HEADLIGHT FOR A MOTOR VEHICLE

BACKGROUND AND SUMMARY OF THE INVENTION

The invention relates to a headlight for a motor vehicle and a corresponding motor vehicle.

Also implementing other light functions, such as side marker light and daytime running light, in a motor vehicle headlight in addition to low beams and high beams is known in the prior art. The problem often exists here that these light functions are supposed to be perceived by other road users, but their attention is not to be excessively drawn.

The object of the invention is to implement the light functions of the side marker light and daytime running light in a motor vehicle headlight in a novel manner.

This object is achieved by the headlight according to the claimed invention.

The headlight according to the embodiments of invention is provided for a motor vehicle, preferably for a passenger vehicle, but possibly also for a utility vehicle. The headlight is preferably a front headlight. Insofar as interactions between the headlight and the motor vehicle and its components are described here and hereinafter, this is always to be understood to mean that the interaction occurs upon installation of the headlight in the motor vehicle. The components of the headlight which have a corresponding interaction with the motor vehicle or component parts of the motor vehicle are therefore designed in such a way that the interaction is induced upon installation of the headlight in the motor vehicle.

The headlight according to embodiments of the invention comprises a housing, which is provided with a translucent cover pane for the exit of light from the headlight and in which a first lighting device and a second lighting device are arranged. The cover pane is therefore a translucent pane, via which the light generated in the headlight exits therefrom. Here and hereinafter, "translucent" is to be understood as partial light transmissibility (translucency) and possibly also light transmissibility of essentially 100% (transparency). In one preferred variant, the cover pane has a transmittance of 90% or more.

The first lighting device is used to generate at least a part of a low beam and/or at least a part of a high beam of the headlight, whereas the second lighting device is provided to generate at least a part of a side marker light and/or at least a part of a daytime running light of the headlight. The second lighting device can therefore contribute to the light function of the daytime running light or side marker light and possibly also to both light functions. The side marker light is provided to indicate the position of the motor vehicle and is also designated hereinafter as the position light. The daytime running light is a light function which is activated during a journey of the motor vehicle in brightness, i.e., when the low beams and high beams are switched off.

The headlight according to embodiments of the invention comprises a diaphragm, preferably manufactured from plastic, such as polycarbonate or PMMA (PMMA=polymethyl methacrylate). The diaphragm is opaque (i.e., transmittance of essentially 0%) in a specified diaphragm section except for a plurality of light exit points provided therein. Via the specified diaphragm section (i.e., the light exit points provided therein), light is emitted toward the cover pane by the second lighting device, in order to generate the at least one part of the side marker light and/or the daytime running light.

Here and hereinafter, light is to be understood as electromagnetic radiation in a spectrum visible to the human eye. Furthermore, the concept of the light exit point is to be understood to mean that in this case it is a light exit surface, which appears punctiform to the human eye upon the observation of the diaphragm. Preferably, the largest dimension of each light exit point in its top view is 4 mm or less. In particular, the largest dimension of each light exit point is between 0.1 mm and 4 mm and particularly preferably between 0.5 mm and 3 mm. The individual light exit points can have different shapes depending on the design. For example, the light exit points have a circular design.

The headlight according to embodiments of the invention has the advantage that a clearly perceptible light function in the form of a side marker light or daytime running light is provided via light exit points in an otherwise opaque area of a diaphragm, but the attention of other road users is not excessively directed to this light.

In a further, particularly preferred embodiment, the total surface of all light exit points in the specified diaphragm section occupies 10% or less of the area of the specified diaphragm section, preferably 2% or less and particularly preferably 1% or less.

In a further embodiment, light exit points are provided in a plurality of different sizes in the specified diaphragm section. Alternatively or additionally, the light exit points can also be arranged in an irregular pattern in the specified diaphragm section. A very appealing light distribution is generated by these variants, which can induce an association with a starry sky in the observer.

In a further variant of the headlight according to the invention, if the diaphragm is a body made of a translucent material, i.e., a translucent or transparent material. In one preferred variant, the material of the body is selected so that it has a transmittance of 90% or more. The body made of this material has an opaque coating in the specified diaphragm section, which is removed at the locations of the light exit points. The coating is preferably lasered off at these points, i.e., it was removed by processing using a laser. The corresponding light exit points in the specified diaphragm section can be produced easily by this variant of the invention.

In one preferred variant of the embodiment just described, the body of the diaphragm is formed from plastic, for example from polycarbonate or PMMA. Alternatively or additionally, the opaque coating can be a PVD coating (PVD=physical vapor deposition). Such coatings are known per se and are applied by physical vapor deposition, such as sputtering. Alternatively or additionally, the opaque coating can also be a reflective metal coating, for example made of chromium, or an aluminized coating. It is also conceivable to provide a painting or a plastic coating. In this way, an appealing design of the diaphragm is achieved. In a further embodiment, the diaphragm extends around the first lighting device, by which a compact integration of the diaphragm in the headlight is achieved.

The diaphragm can possibly also comprise a translucent body and an additional component part, wherein the additional component part is arranged in front of the body and comprises the specified diaphragm section.

In a further, particularly preferred embodiment, the lighting device comprises an optical fiber section having light emission and preferably planar light emission toward the cover pane. The optical fiber section preferably extends at least partially around the first lighting device in a top view of the cover pane. A compact structure of the headlight is ensured by the use of an optical fiber section. Alternatively to an optical fiber, a directly emitting lighting apparatus can also be used, in which light sources (such as LEDs) radiate through a further optical unit.

In a further preferred variant, the headlight additionally comprises a third lighting device for generating at least a part of the side marker light and/or at least a part of the daytime running light of the headlight. In other words, in addition to the second lighting device, the third lighting device can also be used to generate the side marker light or daytime running light. This third lighting device preferably also comprises an optical fiber section having light emission and preferably planar light emission toward the cover pane.

In one preferred embodiment, the third lighting device is arranged behind a translucent or transparent diaphragm section of the diaphragm. In other words, light emission takes place toward the cover pane by the third lighting device via this translucent or transparent diaphragm section. Alternatively or additionally, the third lighting device can be arranged above the first lighting device. It is optionally also possible that the second lighting device and the third lighting device have a common light feed. In particular, the second lighting device and the third lighting device can also be different optical fiber sections of an individual optical fiber, which preferably extends around the first lighting device.

In a further embodiment, the headlight according to the invention furthermore comprises a fourth lighting device for travel direction indication (i.e., a turn signal). This fourth lighting device preferably again comprises an optical fiber section having light emission and preferably planar light emission toward the cover pane.

In a preferred variant, the fourth lighting device is arranged behind a translucent or transparent diaphragm section of the diaphragm. In other words, a light emission takes place toward the cover pane through the fourth lighting device via this translucent or transparent diaphragm section. The flashing light is thus clearly visible. Alternatively or additionally, the fourth lighting device can be positioned below the first lighting device, wherein it is preferably arranged above the second lighting device in this case.

In addition to the above described headlight, the invention relates to a motor vehicle which comprises one or more headlights according to embodiments of the invention or one or more preferred variants of the headlight according to embodiments of the invention.

An exemplary embodiment of the invention will be described in more detail hereinafter on the basis of the appended figures.

DETAILED DESCRIPTION OF THE DRAWINGS

Figure 1:
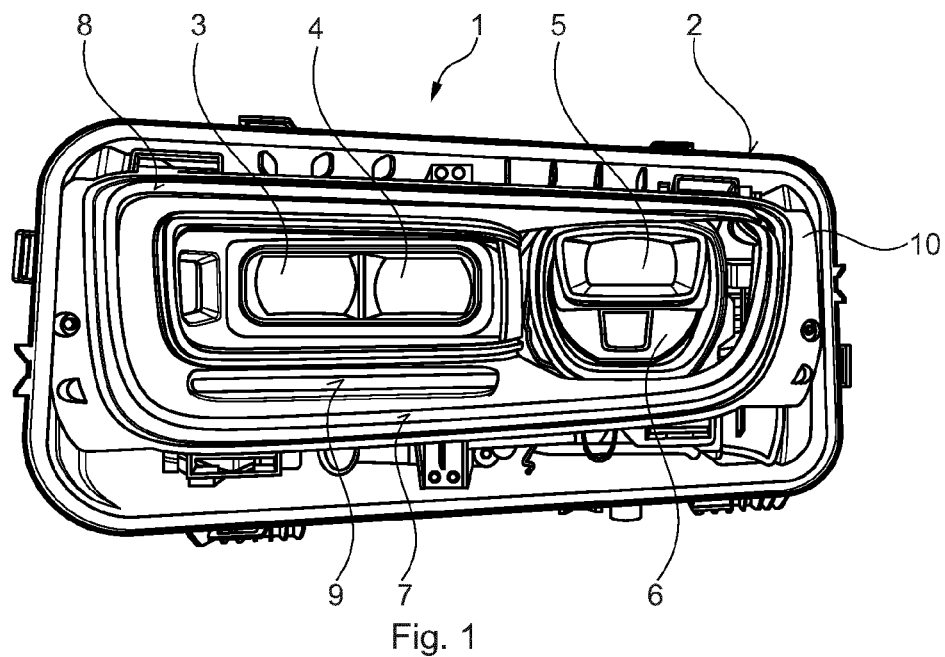
FIG. 1 shows a top view from the front of an embodiment of a headlight according to the invention without attached diaphragm and cover pane.
Figure 2:
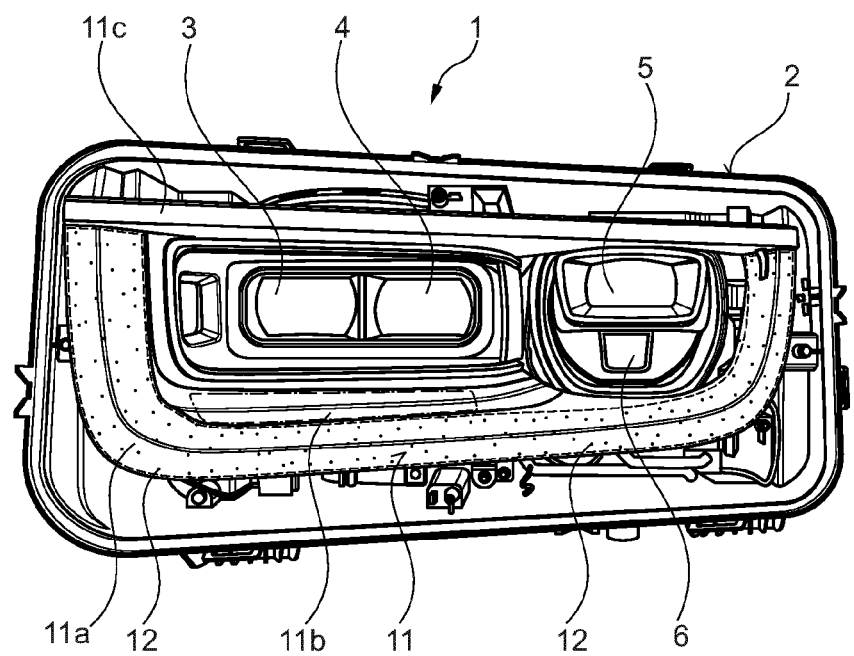
FIG. 2 shows a top view similar to FIG. 1 with attached diaphragm.

An embodiment of the invention is described hereinafter on the basis of a right front headlight. This front headlight is shown in FIG. 1 and FIG. 2 in a top view from the front (i.e., with viewing direction toward its light exit surface) and is identified by reference sign 1. The direction from top to bottom in FIG. 1 and FIG. 2 corresponds to the vertical direction or height direction of the motor vehicle (not shown) when the headlight is installed therein. In a way known per se, the front headlight comprises a housing 2 installed in the motor vehicle, which is covered from the front by a translucent cover pane. The cover pane is not visible from FIG. 1 and FIG. 2. However, it is shown in the exploded view of FIG. 3 and is identified there by reference sign 14.

Optical units, which are known per se, for generating a low beam and a high beam are located in the housing of the headlight. In particular, the two projection optical units 3 and 5 are provided, which are used for generating the low beam, and a projection optical unit 4 and a reflection optical unit 6, using which the high beam of the headlight is generated. These optical units are part of an embodiment of a first lighting device in the meaning of the claims. The optical units 3, 4, and 5 use LEDs as light sources, whereas the reflection optical unit 6 uses laser diodes.

An optical fiber, which comprises the optical fiber sections 7 and 8, extends around the optical units 3, 4, 5, and 6. The optical fiber section 7 initially extends in the top view of FIG. 1 downward from the right corner of the headlight and then runs along the width of the headlight below the optical units 3, 4, 5, and 6 until it again extends upward from the bottom left area of the headlight into its top left corner. The optical fiber section 7 is part of an embodiment of a second lighting device in the meaning of the claims. In contrast to the optical fiber section 7, the optical fiber section 8 only extends in the horizontal direction above the optical units 3 to 6, i.e., from the right to the left corner of the headlight. The optical fiber section 8 is part of an embodiment of a third lighting device in the meaning of the claims.

A further optical fiber section 9, which is part of an embodiment of a fourth lighting device in the meaning of the claims, is provided in the vertical direction between the optical units 3, 4 and the optical fiber section 7. The optical fiber sections 7, 8, and 9 are mounted in a holding frame 10, which is positioned inside the housing 1.

Figure 3:
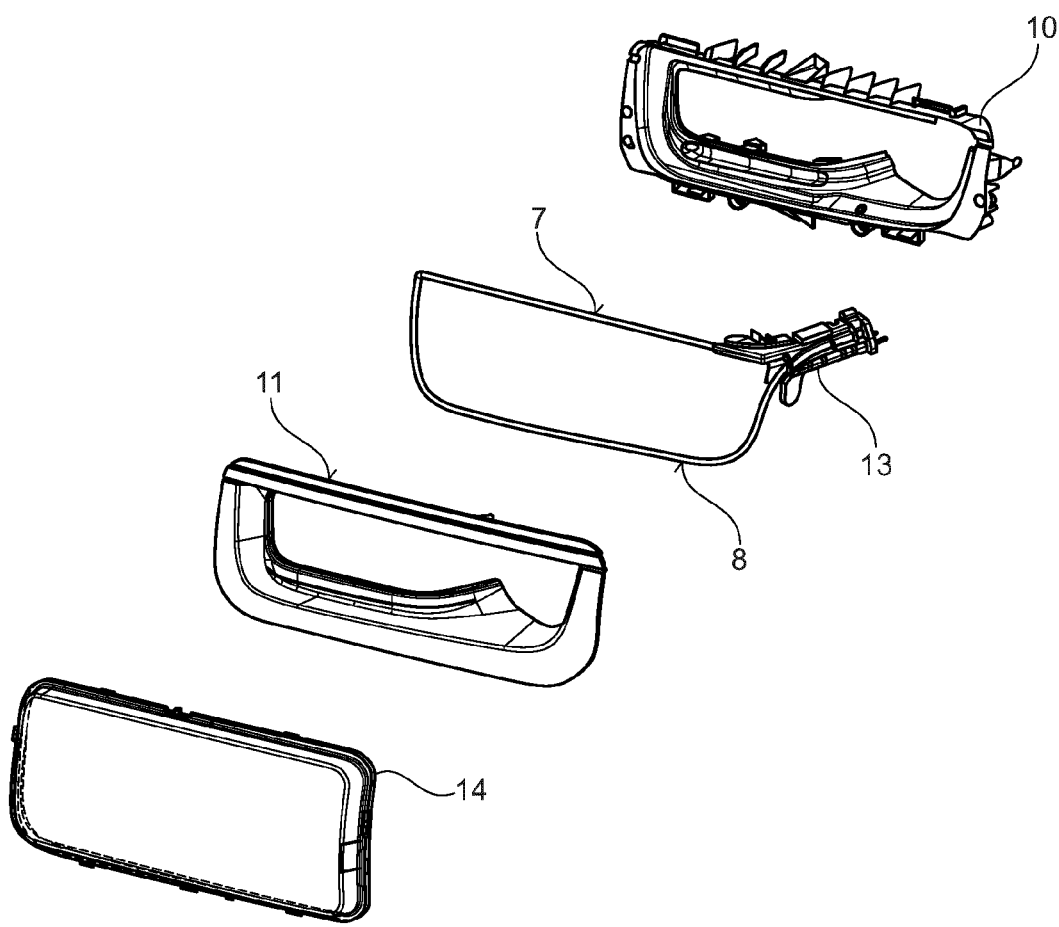
FIG. 3 shows an exploded view, which illustrates several components of the headlight from FIG. 1 and FIG. 2.

This is apparent from the exploded view of FIG. 3. The holding frame 10 and the optical fiber sections 7 and 8 are illustrated in a perspective view therein. Furthermore, it can be seen from FIG. 3 that a light feed 13 is provided in the top right corner of the optical fiber sections 7 and 8, via which the light of corresponding light sources is coupled into the optical fiber section 7 and the optical fiber section 8. The brightnesses of the respective optical fiber sections 7 and 8 can be set differently from one another via the light feed 13.

The optical fiber sections 7, 8, and 9 emit light forward and assume different light functions in the headlight 1. The optical fiber section 7 is used depending on the operating mode for generating daytime running light or position light. In the same manner, the optical fiber section 8 assumes the function of daytime running light in one operating mode and the function of position light in another operating mode. In contrast, the optical fiber section 9 is used as a travel direction indicator (turn signal), which indicates the intended travel direction via lighting up periodically as the vehicle makes a turn. The light source provided for the optical fiber section 9 and the corresponding light feed are not apparent from the illustrated figures. White light is fed into the optical fiber sections 7 and 8, whereas yellow light is coupled into the optical fiber section 9. The optical fiber sections 7 and 8 accordingly emit white light upon activation of the corresponding light sources, whereas the optical fiber section 9 lights up or flashes in a yellow color.

To provide an appealing position light and daytime running light with high recognition value, according to embodiments of the invention, a diaphragm 11 is used which is apparent from the top view of FIG. 2 and from the exploded view of FIG. 3. For reasons of clarity, the holding frame 10 was omitted here in FIG. 2. The diaphragm 11 is a frame component part made of translucent or transparent plastic, which extends around the optical units 3, 4, 5, and 6 in the top view of the headlight according to FIG. 2. For example, the diaphragm is manufactured from polycarbonate or PMMA (polymethyl methacrylate). The front side of the diaphragm 11 directed toward the cover pane 14 is provided in a partial area with an opaque chromium coating, which is applied, for example, via a PVD method (for example sputtering). A coated diaphragm section is identified in FIG. 2 by reference sign 11a, wherein its edge is indicated by a virtual dashed line. The optical fiber section 7 is located behind the diaphragm section 11a. In addition to the diaphragm section 11a, the remaining areas of the diaphragm, with the exception of the diaphragm sections 11b and 11c described hereinafter, are also provided with an opaque chromium coating.

To enable light of the optical fiber section 7 to exit via the coated diaphragm section 11a, a plurality of small exit openings or exit points is provided in the diaphragm section 11a, which are formed, for example, by lasers in the coating of the diaphragm section 11a. These light exit points are only partially identified by the reference sign 12 in FIG. 2 for reasons of clarity. Upon activation of the optical fiber section 7, a very appealing appearance of the daytime running light or position light is achieved via the light exit points, wherein blinding of the oncoming traffic is prevented at the same time. The diameters of the individual light exit points 12 are partially selected in different sizes and the light exit points are distributed unevenly over the diaphragm section 11a. In this way, a perception with an association with a starry sky is created for the observer.

In contrast to the coated diaphragm section 11a, the diaphragm section 11b, which is located below the optical units 3, 4 and above the diaphragm section 11a, is not coated and is thus translucent. The edge of the diaphragm section 11b is indicated by a virtual dot-dash line for illustration. It is ensured via the translucence of the diaphragm section 11b that upon the activation of the optical fiber section 9, which is located directly behind the diaphragm section 11b, a sufficiently bright flashing light is generated, which is perceived clearly by other road users. Similarly to the diaphragm section 11b, the further diaphragm section 11c, which extends above the optical units 3 to 6 and is arranged in front of the optical fiber section 8, is also not coated and is thus translucent. In this way, a good perceptibility of the daytime running light or position light generated in the corresponding operating mode is ensured.

As already mentioned above, the optical fiber sections 7 and 8 can generate both daytime running light and position light depending on the operating mode. The position light is activated, for example, when parking the motor vehicle at the edge of the road or possibly also during a journey of the motor vehicle at night having low beams turned on. Upon activation of the position light, light emission takes place, on the one hand, via the light exit points 12 of the diaphragm section 11a and, on the other hand, via the transparent diaphragm section 11c. The daytime running light is generally activated during a journey in bright conditions with low beams of the headlight turned off. Similarly to the position light, the light emission of the daytime running light takes place by way of the optical fiber sections 7 and 8 via the corresponding diaphragm sections 11a and 11c. In contrast to the position light, however, upon activation of the daytime running light, the power of the light sources radiating into the optical fiber sections 7 and 8 is increased, so that the daytime running light illuminates with a higher level of brightness than the position light.

The embodiments of the invention described above have an array of advantages. In particular, an appealing light function in the form of a daytime running light and position light is implemented in a motor vehicle headlight in a simple manner. For this purpose, a diaphragm is used, which only provides a light exit via a plurality of small light exit points in one section. In this way, an aesthetic light design is achieved and at the same time blinding of other road users is prevented.

LIST OF REFERENCE SIGNS 1 headlight
2 housing
3, 4, 5, 6 optical units/reflectors for low beams and high beams (first lighting device)
7 optical fiber section (second lighting device)
8 optical fiber section (third lighting device)
9 optical fiber section (fourth lighting device)
10 holding frame
11 diaphragm
11a opaque diaphragm section
11b, 11c translucent diaphragm sections
12 light exit points
13 light feed
14 cover pane

The invention claimed is:

1. A headlight for a motor vehicle, the headlight comprising:
a housing which is provided with a translucent cover pane for exit of light from the headlight and in which a first lighting device and a second lighting device are arranged, wherein the first lighting device is provided for generating at least a part of a low beam and/or a high beam of the headlight and wherein the second lighting device is provided for generating at least a part of a side marker light and/or a daytime running light of the headlight; and
a diaphragm which is opaque in a specified diaphragm section except for a plurality of light exit points provided in the specified diaphragm section,
wherein a light emission from the second lighting device takes place toward the cover pane via the specified diaphragm section to generate the at least one part of the side marker light and/or the daytime running light,
wherein each light exit point of the plurality of light exit points is a light exit surface of the diaphragm that appears punctiform upon observation of the diaphragm, and
wherein the diaphragm extends around the first lighting device.

2. The headlight according to claim 1, wherein a largest dimension of each light exit point of the plurality of light exit points in a top view is 4 mm or less.

3. The headlight according to claim 1, wherein a largest dimension of each light exit point of the plurality of light exit points in a top view is between 0.1 mm and 4 mm.

4. The headlight according to claim 1, wherein a largest dimension of each light exit point of the plurality of light exit points in a top view is between 0.5 mm and 3 mm.

5. The headlight according to claim 1, wherein a total area of all of the plurality of light exit points in the specified diaphragm section occupies 10% or less of an area of the specified diaphragm section.

6. The headlight according to claim 1, wherein a total area of all of the plurality of light exit points in the specified diaphragm section occupies 2% or less of an area of the specified diaphragm section.

7. The headlight according to claim 1, wherein a total area of all of the plurality of light exit points in the specified diaphragm section occupies 1% or less of an area of the specified diaphragm section.

8. The headlight according to claim 1, wherein, in the specified diaphragm section, the plurality of light exit points are provided in a plurality of different sizes and/or the plurality of light exit points are arranged in an irregular pattern in the specified diaphragm section.

9. The headlight according to claim 1, wherein the diaphragm is a body made of a translucent material, which includes an opaque coating in the specified diaphragm section, which is removed at the locations of the plurality of light exit points.

10. The headlight according to claim 9, wherein the body of the diaphragm is formed from plastic and/or the opaque coating is a PVD coating and/or a reflective metal coating.

11. The headlight according to claim 1, wherein:
the second lighting device comprises an optical fiber section having light emission toward the cover pane.

12. The headlight according to claim 11, wherein the optical fiber section extends at least partially around the first lighting device in a top view of the cover pane.

13. The headlight according to claim 1, further comprising:
a third lighting device for generating at least a part of the side marker light and/or the daytime running light of the headlight device.

14. The headlight according to claim 13, wherein the third lighting device comprises an optical fiber section having light emission toward the cover pane.

15. The headlight according to claim 13, wherein the third lighting device is arranged behind a translucent or transparent diaphragm section of the diaphragm and/or above the first lighting device.

16. The headlight according to claim 1, further comprising:
a fourth lighting device for travel direction indication.

17. The headlight according to claim 16, wherein the fourth lighting device comprises an optical fiber section having light emission toward the cover pane.

18. The headlight according to claim 16, wherein the fourth lighting device is arranged behind a translucent or transparent diaphragm section of the diaphragm and/or below the first lighting device.

19. A motor vehicle comprising the headlight according to claim 1.

* * * * *